Feb. 7, 1933.  W. G. ZERZOW  1,896,655

FILTER

Filed April 23, 1930  2 Sheets-Sheet 1

William G. Zerzow, Inventor.
By Emil Leubert
Attorney.

Witness:
J. J. Oberst.

Feb. 7, 1933. W. G. ZERZOW 1,896,655
FILTER
Filed April 23, 1930 2 Sheets-Sheet 2

William G. Zerzow, Inventor.
By Emil Kuelich
Attorney.

Witness:
J. J. Oberst.

Patented Feb. 7, 1933

1,896,655

UNITED STATES PATENT OFFICE

WILLIAM G. ZERZOW, OF BUFFALO, NEW YORK

FILTER

Application filed April 23, 1930. Serial No. 446,562.

My invention relates to filters; and more particularly to filters adapted for filtering cleaning solvents and lubricating or other oils, although it may be used for filtering other materials, if desired.

The primary object of my invention is the provision of a filter capable of use as an individual machine or as a built-in portion of a washer or cleaning machine of the type generally known as a dry-cleaning machine.

Another object is the production of a filter which can be operated at a high rate of speed without possibility of the liquid being sprayed or splashed onto surrounding parts; and one which is comparatively inexpensive, simple in construction and compact in form.

Another object is the production of a filter having a practically air-tight casing or enclosure so that it may be operated under a vacuum, and so that the escape of fumes is prevented. This is highly desirable when filtering gasoline or other explosive solvents, lubricating oil and other like liquids.

A further object is to so construct the filter that it can be easily and conveniently cleaned, without disassembling the parts thereof or permitting fumes escaping to a degree which is dangerous, or even obnoxious to the sense of smell.

A further object of my invention is the provision of novel and efficient means for loosening the dirt and other foreign accumulations from the filtering element without opening up the casing or enclosure of the apparatus; and also novel means for receiving the accumulations so loosened.

A further object is the provision of a new and novel filtering element, so constructed that it will, when used to filter a cleaning solvent of the kind containing a filter-aid, intercept the filter-aid and foreign accumulations and retain them in cake form and also permit the removal of the caked filter-aid and foreign accumulations therefrom without possibility of damaging the filtering element.

Still further objects are, the provision of new and novel feed mechanism whereby an even distribution of the liquid to be filtered is assured over the filtering element; and to provide a new and novel deflector for the filtered liquid with a view of preventing its coming in contact with the unfiltered liquid or in any manner being made to again pass through the filtering element, even in the smallest quantity.

With the above, and other objects to appear hereinafter, my invention consists in the novel construction, and in the combination and arrangement of parts to be hereinafter described, and more particularly pointed out in the subjoined claims.

Figure 1:
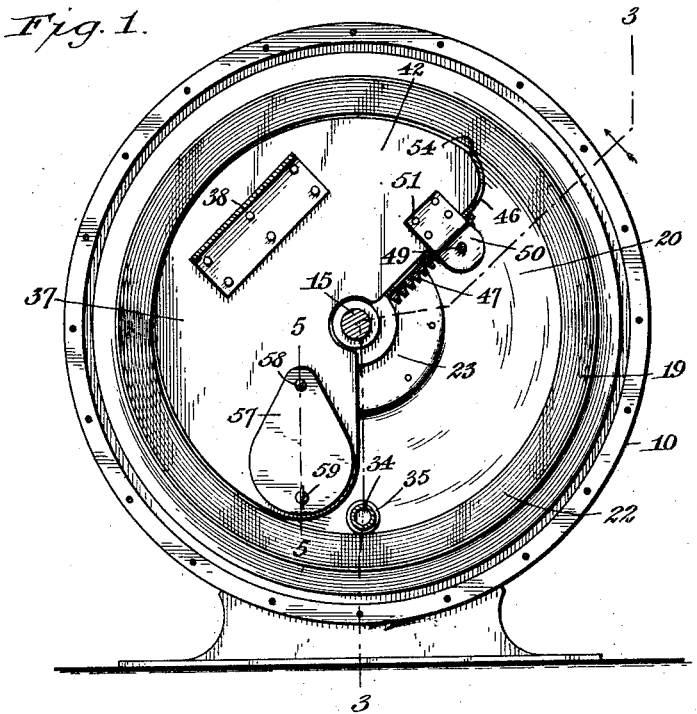
Fig. 1 is a transverse section of the apparatus, taken on line 1—1, Fig. 3, showing the enclosed filtering reel or member in end elevation.

Reference being had to the drawings in detail, the numeral 10 designates a casing or enclosure, which comprises a peripheral wall 11, a fixed end wall 12 and a removable end wall or cover 13.

Secured axially to the inner side of the fixed end wall 12 is a bearing 14 in which one end of a shaft 15 is journaled; this shaft being also journaled in a bearing 16 applied axially to the outer side of the removable wall or cover 13. As the shaft is adapted to be rotated at a comparatively high rate of speed, the bearings 14 and 16 are preferably anti-friction bearings, and the shaft has at its outer end a loose pulley 17 and a tight pulley 18 thereon, around either of which a driving belt (not shown) is trained. By means of suitable belt-shifting mechanism common to machinery of various kinds, the belt may be shifted from one pulley to the other, depending on whether or not the shaft and parts carried thereby, as will presently be described, are to be rotated. Any other means for rotating and controlling the rotation of such parts may be employed, is desired.

The fixed and removable end walls 12 and 13, respectively, are applied to the cylindrical wall in any suitable manner to render the casing air-tight, or substantially so.

Secured to the shaft 15 is what I term the filtering reel or member, which is designated by the numeral 19, considered as a whole, and it comprises an end wall 20, a peripheral filtering wall or cylindrical filtering element 21 and an end circular flange 22 providing a large opening at the end opposite the end wall 20. The filtering reel or member may therefore be said to be closed at one end, and open at the other except for the flange 22, which may be said to serve as a trap or guard for the unfiltered liquid delivered into the filtering reel or member; the open end being adjacent the removable end wall or cover 13 of the casing.

The end wall 20 of said filtering reel or member includes a casting 23 forming a hub through which the shaft 15 is passed; the hub being secured to the shaft by means of a set screw 24 screw-threaded through the hub and bearing against the shaft. Any other means for securing the filtering reel or member to the shaft may, however, be employed.

The peripheral wall or cylindrical filtering element 21 comprises a plurality of foraminous layers; there being four such layers in the form shown in the drawings, designated, respectively, 25, 26, 27, and 28; the outermost layer 25 being preferably an immovable part of the filtering reel, while the layers 26, 27 and 28 are adjuncts and readily removable from the reel but nevertheless form an essential and at least in part a necessary portion of the filtering wall or element of the reel. The said foraminous adjuncts are nested one within the other so as to lie in firm contact and the nested adjuncts lie firmly against the inner surface of the outer immovable foraminous layer and are so maintained by suitable retaining means, preferably annular retainer rings 29 of angular cross sectional formation, one flange or web of one of which bears against the trap or guard flange 22 and has fastening screws 29ª passed therethrough and threaded into said trap or guard flange, while the other flange or web thereof bears against the inner side of the innermost foraminous layer 28 at one end thereof. The other retainer ring 29 is similarly applied to the end wall 20 of the filtering reel and bears in a like manner against said innermost foraminous layer at the opposite end thereof.

The removable wall or cover 13 of the casing has an opening 30 formed therein near its lower end and at opposite sides thereof are secured by means of bolts or otherwise internally screw-threaded sockets or pipe fittings 31, the openings of which register with the opening 30 in said removable wall or cover.

A supply or feed pipe 32 is screw-threaded into the outer socket 31 and it has a hand valve 33 therein to shut off and to regulate the supply of the liquid to be filtered. To the inner socket 31 a liquid distributer is secured; this being preferably in the form of a pipe or conduit 34 having one end screw-threaded into said socket and its other end closed with a cap 35, or otherwise. This distributer, or distributing tube as it may be called, extends into the filtering reel from the open end thereof and terminates adjacent its closed end, and its location is such that it is in close proximity to the edge of the trap or guard flange 22 at a low point of the filtering reel.

Figures 6, 7:
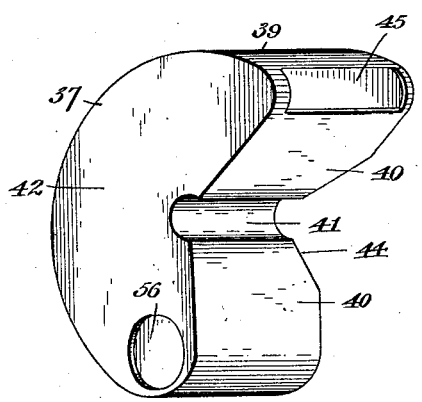
Fig. 6 is an enlarged horizontal section taken on line 6—6, Fig. 3.
Fig. 7 is a detached perspective view of the accumulator.

Along the region of the distributer pipe extending into the filtering reel a longitudinally disposed slot 36 is formed and this slot is gradually widened toward the closed end of the reel, as best shown in Fig. 6. Since the liquid to be filtered is delivered into the filter under pressure—a pump usually being provided for the purpose—the escape of the liquid is approximately equalized along the slot, since the pressure is gradually lessened from the open end of the pipe toward its closed end.

Arranged within the filtering reel 19 is a dirt and waste accumulator, in the form of a parti-cylindrical box or receptacle 37. This box or receptacle is fastened to the inner side of the removable end wall or cover 13 of the casing, a bracket 38 being provided for the purpose.

The box or casing is therefore immovable and encircled by the cylindrical filtering wall of the filtering reel, into which latter it extends from said wall or cover 13. The peripheral wall of the filtering reel therefore travels in a circular path around said box or receptacle, and in preferred form said box or receptacle has a curved wall 39 merging at opposite ends into the outer ends of radial walls 40 arranged at an obtuse angle to each other, the inner ends of said radial wall being connected by a small parti-cylindrical or concaved wall 41, forming a depression through which the shaft 15 extends. These walls are connected at opposite ends by end walls 42, 43; the outer end wall 42 being flat throughout and having the bracket 38 secured thereto, and the inner end wall 43, while flat over its major region, has a depressed central portion 44 forming a pocket into which the hub of the end wall of the filtering reel extends.

Figure 2:
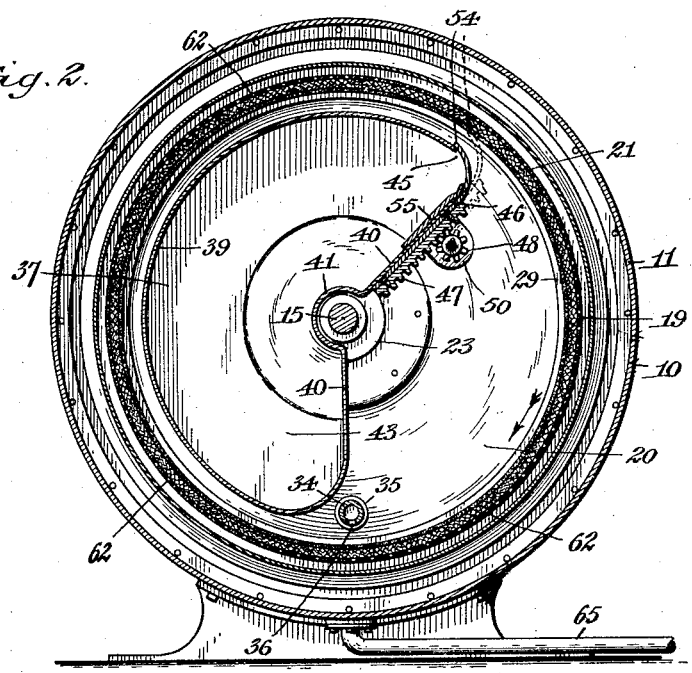
Fig. 2 is a transverse section, taken on line 2—2, Fig. 1.
Figure 3:
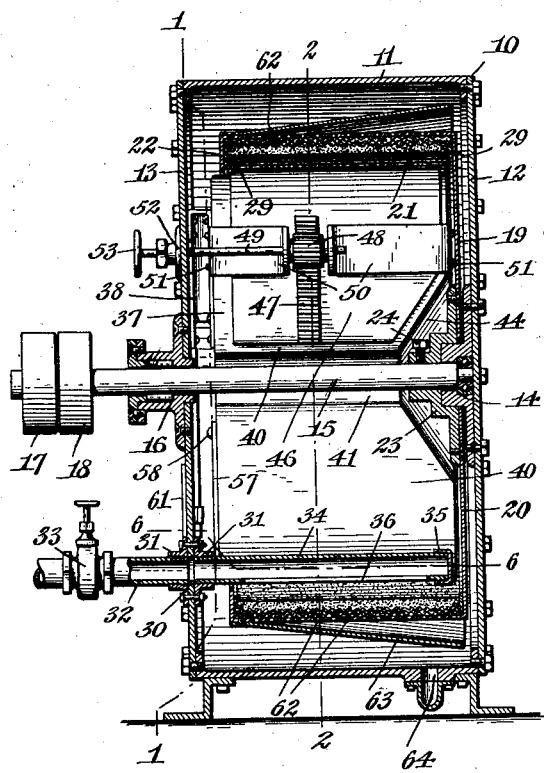
Fig. 3 is a longitudinal section taken on line 3—3, Fig. 1, looking in the direction of the arrow crossing said line.
Figure 4:
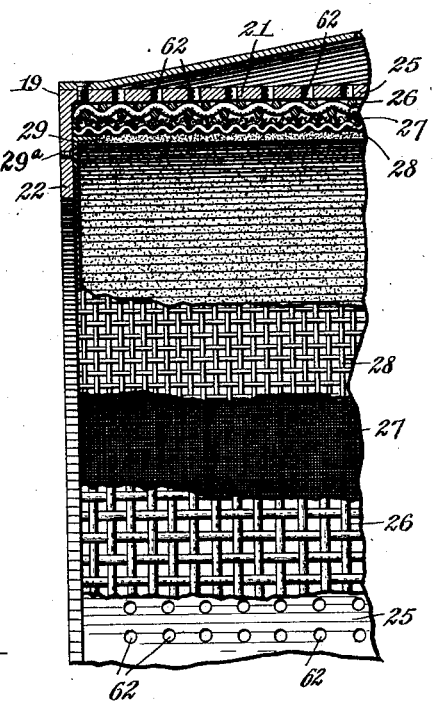
Fig. 4 is an enlarged longitudinal section through a portion of the filtering reel or member showing overlying portions of the layer elements forming the peripheral wall thereof broken away to illustrate its structural formation.
Figure 5:
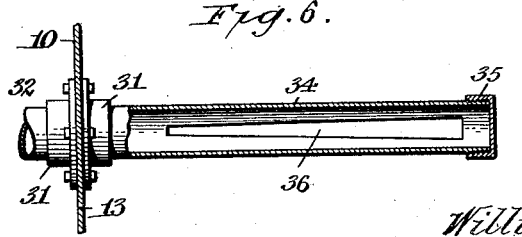
Fig. 5 is an enlarged vertical section taken on line 5—5, Fig. 1.

Said dirt or waste accumulating box or receptacle has a receiving opening 45 at its upper end, or more particularly expressed, at the region of merging the upper end of its curved wall 39 into the adjacent radial wall 40; said opening extending well into said radial wall, as best shown in Fig. 2.

Arranged to slide along the outside of the upper radial wall 40 is a flat comparatively wide guide plate 46 whose upper end serves as a combined cover and scraper; said upper end being adapted to close said receiving opening and under certain conditions remove caked accumulations from the inner surface of the peripheral filtering wall 19 of the filtering reel. The combined cover and scraper is curved to conform to the curved portion of the box or receptacle having the receiving opening therein and it is both wider and longer than said opening so that it completely covers the same.

Arranged between the ends of the guide plate 46 is a gear rack 47, with which meshes a gear wheel 48 secured to a shaft 49 arranged parallel with the shaft 15 and journaled in bearings provided by brackets 50 fastened to opposite ends of the box, as at 51. These brackets extend inwardly from their points of attachment to the box and lie against the outer surface of the guide plate so as to serve as retainers for the same, and at their inner ends they are directed outwardly to form the bearings for the shaft 50. This shaft extends outward through the removable end wall or cover 13 of the casing and through a stuffing box 52 secured to the outer side of said wall or cover. The outer end of said shaft has a hand wheel 53 secured thereto to permit of conveniently rotating it to open or close the combined cover and scraper 46. The purpose of opening said combined cover and scraper is to bring the outer edge 54 thereof against the caked accumulations on the inner surface of the peripheral filtering wall, as shown by dotted lines in Fig. 2, and upon rotation of the reel in the direction of the arrow in said figure, the accumulations will be loosened and drop into the box through the receiving opening 45, now uncovered. Any of the loosened material not dropping directly into the box will move along the curved cover and be directed thereby into the box. With a view of preventing the loosened accumulations lodging between the radial wall 40 and the guide plate 41, a guard plate 55 is secured to plate 41 at the junction of the flat portion thereof with the cover or curved portion and it is spaced from the inner side of said flat portion to receive the adjacent radial wall 40 in the space so provided. The loosened accumulation moving downwardly along the curved cover and scraper is directed onto the guard plate 55, and from there finds its way into the accumulator box 37.

It is, of course, understood that if the caked accumulations on the peripheral filtering wall of the filtering reel cannot be fully removed with one setting or adjustment of the scraper, the shaft 49 is rotated slowly, continuously or intermittently, during the rotation of the filtering reel; and it is further to be understood that the filtering reel is rotated in a comparatively slow manner during the cleaning operation, since if rotated at the speed intended for the filtering operation, the cleaning operation would be ineffective, due to considerable of the loosened accumulations being carried beyond the receiving opening in the accumulator box.

The accumulator box 37 is provided at a low point with a clean-out opening 56 closed by a gate 57 pivotally secured to the box at a point above said openings, as at 58, and having a catch 59 at its lower end adapted to engage behind the outer end wall 42 of said accumulator box directly beneath said opening.

The removable end wall or cover 13 of the casing has an opening 60 in line with the opening 56 in the accumulator box, and this opening is also closed by means of a cover 61 secured in place in any approved manner.

As stated, this improved filter may be used for filtering lubricating and other oils; also other liquids, but it is particularly designed for filtering solvents or cleaning liquids used in dry cleaning plants, and it is common to introduce into the solvent a powdered substance of suitable kind which is usually referred to as a "filter-aid". This filter-aid becomes caked on the filtering wall or element of the filter and the cake so formed is porous and permits the liquid to pass therethrough. In fact, the dirt and other foreign matter removed from clothing or other articles of use under the dry cleaning process is also removed from the liquid during the act of filtering the same, and this dirt, also lint and other foreign matter, becomes mixed with the filter-aid and forms part of the caked substance adhering to the filtering wall.

With a view of providing a filtering wall which will assure a thorough filtering of the liquid, be substantial, and trap the filter-aid, dirt and other foreign substances that will adhere to the filtering wall in cake form, the outer layer 25 of the foraminous structure forming this filtering wall is composed of the cylindrical sheet metal wall of the filtering reel proper, and this sheet metal wall if provided with perforations 62 which are large enough and are spaced apart in a manner to assure a free flow of the liquid therefrom. The next layer 26 is a comparatively coarse-mesh wire screen. The layer 27 lying in contact with the coarse-mesh screen is a comparatively fine-mesh wire screen, the meshes being sufficiently close to prevent the passage of the filter-aid, dirt, and other matter therethrough, and therefore serves as a trap for such material. The innermost layer 28 may also be a wire mesh screen considerably coarser than the layer 27, but finer than the layer 26.

In filtering liquid containing a filter-aid, the filter-aid will readily pass through the meshes of the innermost foraminous layer formed by the wire mesh screen 28, and will be prevented from passing through the interstices of the comparatively fine wire mesh screen 27, and filter-aid and foreign matter contained in the liquid lodges upon the fine mesh screen and fills the interstices of the innermost foraminous layer 28. During the filtering operation, the filter-aid and foreign material accumulates on the inner surface of said layer 28 and builds up in the form of a cake. The cake so formed is porous and permits the passage of the liquid therethrough, while the filter-aid and dirt or foreign matter in the liquid adheres to the inner surface of the cake being gradually built up or thickened. The result of this is that the cake eventually becomes comparatively thick and offers resistance to the free passage of the liquid therethrough. The free passage of liquid through the caked filtering wall is essential to maintain the capacity of the machine. When the filtering process is retarded by reason of the caked layer becoming too thick, the machine is stopped and the shaft 50 rotated by means of the handle 51 thereon so as to move the upper edge of the combined cover or scraper into contact with the built-up cake on the filtering wall of the filter reel, pressure being maintained against the caked material by means of said handle. The filter reel is then slowly rotated so that the edge of the combined cover and scraper loosens the caked material from the inner foraminous layer 28 of said filtering wall. The material so loosened drops into the accumulator box and may be removed therefrom at any convenient time through the openings 50 and 60 in said box and the removable wall or cover 13 of the casing, respectively.

By reason of the upper radial wall 40 of said accumulator box being inclined at an angle to the vertical, the loosened material gravitates onto the inner surface of the combined cover and scraper and the inner surface of the guard plate and by the latter is directed downwardly in the accumulator box. It is therefore impossible for any of the loosened material to enter the filtering reel, and thus add additional foreign matter to the liquid in said reel.

Surrounding the filtering wall 21 of the filtering reel is a rearwardly-flaring concentrator wall 63, the front end of which is secured to the front end of the filtering reel so that a gradual rearwardly-enlarged space is provided between the filtering reel and said concentrator wall. This concentrator wall directs the filtered liquid to the rear end of the casing, thus preventing splashing of the liquid during the rotation of the reel and guarding against the liquid entering the open front end of the reel and being compelled to pass through the filtering wall thereof a second time. The casing 10 is provided with a discharge outlet 64 at its lowest point, to which is connected a discharge 65.

As is common in filtering apparatus used in connection with dry cleaning machinery, the filtered liquid is returned to such machinery, and the outlet pipe 65 may be connected with a pump so that the filtered liquid may be drawn into the pump and be returned to the washer or dry cleaning machine under pressure.

It may here be stated that the advantage of the foraminous layers constituting the filtering wall is that under the construction shown and described, a free passage for the liquid is provided through said wall so that a comparatively large capacity is assured for the filter. Moreover, the wire mesh screen lying between the outer perforated layer 25 and the fine mesh screen 27 prevents the latter from extending or bulging outwardly through the perforations in the outermost layer, while the innermost screen 28 provides a foundation for building up the cake, consisting of the filter-aid and foreign matter, and also protects the fine screen 27 from the scraper when applied to remove the caked material from the filtering wall. The innermost screen also aids to build up a comparatively thin cake of filter-aid and other solid matter on the finer screen 27, although the meshes of the innermost screen become filled and the screen itself becomes coated.

When the surplus caked material is removed from the innermost screen, the filter-aid and foreign matter accumulated in the meshes of the innermost screen and on the portions of the inner surface of the adjacent fine screen exposed through the meshes of the coarser innermost screen will remain in the meshes of the last-mentioned screen, thus leaving a thin caked layer on the finer screen, built up where exposed, to the thickness of the innermost screen.

By reason of the filtering reel rotating at a high rate of speed, the liquid delivered into said reel clings to the cylindrical filtering element under centrifugal force, which aids in the filtering operation and assures maximum capacity under proper working conditions or, expressed in other words, until the caked accumulations on said peripheral filtering wall builds up to offer resistance against the flow of the liquid through said wall.

Having thus described my invention, what I claim is:

1. A filter, comprising a substantially airtight cylindrical casing having an outlet for filtered liquid and an inlet for the liquid to be filtered, a shaft axially disposed in said casing extending outwardly therefrom, a filtering reel secured to said shaft and rotatable therewith, said filtering reel having a cylindrical filtering wall, an accumulator box arranged within said filtering reel and immovably held to one of the walls of said casing and having an opening at its upper end, a combined cover and scraper associated with said opening and acting to normally close said opening, said combined cover and scraper being adapted to be moved against the peripheral filtering wall of said reel and simultaneously open the opening in said accumulator box, said scraper serving upon rotation of said reel to remove accumulations from said filtering wall and deliver the loosened accumulations into said accumulator box through said opening, means for actuating said combined cover and scraper from the exterior of said casing, and means extending into said filtering reel for delivering liquid to be filtered thereinto, said means being in connection with the inlet opening of said casing.

2. A filter, comprising a casing having a cylindrical wall and opposite end walls, one of said end walls being removable, said end walls being provided with bearings, a shaft journaled in said bearings, a filtering reel within said casing secured to said shaft and having a peripheral filtering wall, an accumulator box carried by said removable end wall and projecting into said filtering reel, said accumulator box having a parti-cylindrical wall, two radial walls merging into the ends of said parti-cylindrical wall, and opposite end walls, one of said radial walls being inclined to the vertical, said accumulator box having an opening at the region of merging of the upper end of said parti-cylindrical wall with said inclined radial wall, a guide plate lying against the outer side of said inclined radial wall and having a curved upper end serving as a cover for said opening and as a scraper, and means for moving said guide plate outwardly on said box to uncover said opening and to move the outer edge thereof in contact with the peripheral filtering wall of said filtering reel, said means including a shaft extending through the removable end wall of said casing for actuating said guide plate.

3. A filter, comprising a casing, a filtering reel rotatable in said casing, said filtering reel being closed at one end and open at its other, and a feed pipe extending from one end wall of said casing into said reel and having a slot arranged lengthwise therein gradually widened from the open end of said reel toward the closed end thereof.

4. A filter having a feed pipe extending thereinto for delivering liquid under pressure to be filtered, said feed pipe having a slot arranged lengthwise therein gradually enlarged in width in the direction of the flow of the liquid therethrough.

5. A filter, comprising an air-tight casing, a shaft axially disposed in said casing, a filtering reel secured to said shaft and rotatable therewith, said filtering reel having a cylindrical filtering wall and a stationary accumulator box within said filtering reel having an opening to receive scrapings from the inner surface of said reel, a combined cover and scraper associated with said opening and acting to normally close the same, said combined cover and scraper being movable to uncover said opening and to act as a scraper without removing adhering matter from said reel.

6. A filter, comprising a substantially airtight cylindrical casing, a shaft axially disposed in said casing, a filtering reel secured to said shaft and rotatable therewith, said reel having a cylindrical filtering wall, an accumulator box arranged within said filtering reel and receiving support from said casing, said accumulator box having an opening, and scraping mechanism normally closing said opening and movable to uncover said opening and act to remove matter adhering to the inner surface of said filtering wall.

7. A filter, comprising an air-tight casing, a filtering element confined and movable therein and having a filtering wall, an accumulator box disposed in a fixed position within the filtering element, scraping mechanism movable toward and from said filtering wall and serving to remove matter adhering to said wall and deliver the same into said accumulator box, and means rendering said accumulator box accessible only upon opening said casing.

8. A filter, comprising a cylindrical airtight casing, a filtering reel confined and rotatable within said casing and having a cylindrical filtering wall, means to remove matter adhering to the inner surface of said filtering wall, and means confined wholly within said casing to receive the matter removed from said filtering wall, said last-mentioned means being accessible only upon opening of said casing.

9. A filter, comprising a filtering element having a filtering wall and an opening, scraping mechanism movable toward and from said filtering wall and adapted to remove matter adhering thereto, and means immovably disposed within said filtering element adapted to receive and retain the matter removed from said filtering wall, said scraping mechanism being supported by said immovably disposed means and co-operating therewith to deliver the removed matter thereinto.

10. A filter, comprising a cylindrical casing having an opening to gain access to the interior thereof, a filtering reel rotatable in said casing closed at one end and open at the other, an accumulator box having a fixed position within said filtering reel and having its interior accessible through the opening of said casing, said accumulator box having a receiving opening and scraping mechanism normally closing said receiving opening and serving to free said reel from adhering matter and deliver the same into said accumulator box through said receiving opening.

11. A filter, comprising a cylindrical air-tight casing having an opening and a closure for said opening to gain access to the interior thereof, a filtering reel rotatable in said casing closed at one end and open at its other end so that the interior thereof is accessible through the opening of said casing when the closure thereof is removed, an accumulator box within said filtering reel having an opening and a closure for said opening accessible through the opening in said casing and the open end of said reel, said accumulator box having a recieving opening to receive matter adhering to the interior of said reel, and scraping mechanism normally closing said receiving opening and movable to engage the acumulations on the interor of said reel so as to free the same and direct the freed accumulations into said accumulator box through its receiving opening.

12. A filter, comprising an air-tight casing, a filtering element within said casing, an accumulator receptacle within said filtering element, adjustable means to direct accumulations adhering to said filtering element into said accumulator receptacle, said means and filtering element being relatively movable to cause removal of said accumulations from said filtering element, and mechanism for actuating said adjustable means accessible from the exterior of said air-tight casing.

13. A filter, comprising an air-tight casing capable of operating under vacuum, a filtering element within said casing, an accumulator receptacle within said filtering element having a receiving opening through which accumulations from said filtering element are delivered into said receptacle, and means within said filtering element for scraping accumulations from the same and direct said accumulations into said accumulator receptacle through said receiving opening.

In testimony whereof, I affix my signature.

WILLIAM G. ZERZOW.